US012711407B2

(12) United States Patent
Zhang et al.

(10) Patent No.: US 12,711,407 B2
(45) Date of Patent: Aug. 18, 2026

(54) REASONING METHOD BASED ON STRUCTURAL ATTENTION MECHANISM FOR KNOWLEDGE-BASED QUESTION ANSWERING AND COMPUTING APPARATUS FOR PERFORMING THE SAME

(71) Applicant: SEOUL NATIONAL UNIVERSITY R&DB FOUNDATION, Seoul (KR)

(72) Inventors: Byoung-Tak Zhang, Seoul (KR); Yu-Jung Heo, Seoul (KR); Eun-Sol Kim, Hanam-si (KR); Woo Suk Choi, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 838 days.

(21) Appl. No.: 18/083,069

(22) Filed: Dec. 16, 2022

(65) Prior Publication Data

US 2024/0070492 A1 Feb. 29, 2024

(30) Foreign Application Priority Data

Aug. 31, 2022 (KR) ........................ 10-2022-0110335

(51) Int. Cl.
*G06N 5/04* (2023.01)
*G06N 5/022* (2023.01)

(52) U.S. Cl.
CPC ............... *G06N 5/04* (2013.01); *G06N 5/022* (2013.01)

(58) Field of Classification Search
CPC .......... G06N 5/04; G06N 5/022; G06N 3/042; G06N 3/045; G06N 3/08; G06F 16/3329;
(Continued)

(56) References Cited

U.S. PATENT DOCUMENTS

2015/0347480 A1 12/2015 Smart
2021/0103827 A1 4/2021 Quamar et al.
(Continued)

FOREIGN PATENT DOCUMENTS

KR 10-2020-0059999 A 5/2020
KR 10-2022-0019461 A 2/2022
(Continued)

OTHER PUBLICATIONS

Johnson et al., "Image Retrieval using Scene Graphs", Jun. 2015, 2015 IEEE Conference on Computer Vision and Pattern Recognition (CVPR), 11 pages (Year: 2015).*
(Continued)

*Primary Examiner* — Jennifer N Welch
*Assistant Examiner* — Vijay M Balakrishnan
(74) *Attorney, Agent, or Firm* — Sughrue Mion, PLLC

(57) ABSTRACT

Disclosed herein are a reasoning method based on a structural attention mechanism for knowledge-based question answering and a computing apparatus for performing the reasoning method. The reasoning method includes: recognizing one or more entities in a query including content and a question, and linking the recognized entities to a knowledge base; constructing a question hypergraph and a query-aware knowledge hypergraph by performing a multi-hop graph walk on a question graph and the knowledge base; and inferring a correct answer to the question by applying as attention mechanism to a query hyperedge and a knowledge hyperedge included in the question hypergraph and the query-aware knowledge hypergraph, respectively.

6 Claims, 10 Drawing Sheets

(58) Field of Classification Search
CPC ... G06F 16/9024; G06F 40/284; G06F 40/295
See application file for complete search history.

(56) References Cited

U.S. PATENT DOCUMENTS

| | | | |
|---|---|---|---|
| 2022/0164679 | A1 | 5/2022 | Taylor et al. |
| 2022/0179857 | A1 | 6/2022 | Kompella et al. |
| 2022/0350826 | A1 | 11/2022 | Zhang et al. |

FOREIGN PATENT DOCUMENTS

| | | | |
|---|---|---|---|
| KR | 10-2022-0022701 | A | 2/2022 |
| KR | 10-2022-0048319 | A | 4/2022 |

OTHER PUBLICATIONS

Vaswani et al., "Attention Is All You Need", 2017, 31st Conference on Neural Information Processing Systems (NIPS 2017), 11 pages (Year: 2017).*

Kim et al., "Hypergraph Attention Networks for Multimodal Learning", Jun. 2020, 2020 IEEE/CVF Conference on Computer Vision and Pattern Recognition (CVPR), 10 pages (Year: 2020).*

Khan et al., "Expressive Scene Graph Generation Using Commonsense Knowledge Infusion for Visual Understanding and Reasoning", May 29, 2022, The Semantic Web: 19th International Conference, ESWC 2022, https://doi.org/10.1007/978-3-031-06981-9_6, 20 pages (Year: 2022).*

Xiong et al., "SA-VQA: Structured Alignment of Visual and Semantic Representations for Visual Question Answering", Jan. 25, 2022, arXiv:2201.10654v1, 11 pages (Year: 2022).*

Zhang, Qi et al., "Context-Aware Attention Network for Image-Text Retrieval", 2020, 2020 IEEE/CVF Conference on Computer Vision and Pattern Recognition (CVPR), 10 pages (Year: 2020).*

Heo et al., "Hypergraph Transformer: Weakly-Supervised Multi-hop Reasoning for Knowledge-based Visual Question Answering", arXiv:2204.10448v1, 2022, 18 Pages total.

Heo et al., "Hypergraph Transformer: Weakly-Supervised Multi-hop Reasoning for Knowledge-based Visual Question Answering", Proceedings of the 60th Annual Meeting of the Association for Computational Linguistics, 2022, vol. 1, pp. 373-390 (18 pages total).

* cited by examiner (a)

(b)

REASONING METHOD BASED ON STRUCTURAL ATTENTION MECHANISM FOR KNOWLEDGE-BASED QUESTION ANSWERING AND COMPUTING APPARATUS FOR PERFORMING THE SAME

CROSS-REFERENCE TO RELATED APPLICATION

This application claims the benefit of Korean Patent Application No. 10-2022-0110335 filed on 2022 Aug. 31, which hereby incorporated by reference herein in its entirety.

BACKGROUND

1. Technical Field

The embodiments disclosed herein relate to knowledge-based question answering, and more particularly to a reasoning method based on a structural attention mechanism for knowledge-based question answering and a computing apparatus for performing the same.

This study was carried out as a result of the research into the "(SW Star Lab) Cognitive Agents That Learn Everyday Life" task (IITP-2015-0-00310-008) of the SW Computing Industry Fundamental Technology Development Project, the "Development of Brain-inspired AI with Human-like Intelligence" task (ITTP-2019-0-01371-004) of the Innovation Growth Engine Project, the "Development of Uncertainty-Aware Agents Learning by Asking Questions" task (ITTP-2022-0-00951-001) of the Human-centered Artificial Intelligence Fundamental Technology Development Project, the "Self-directed AI Agents with Problem-solving Capability" task (IITP-2022-0-00953-001) of the Human-centered Artificial Intelligence Fundamental Technology Development Project, and the "Artificial Intelligence Innovation Hub" task (IITP-2021-0-02068-002) of the Information, Communications, and Broadcasting Innovation Talent Nurturing Project that were sponsored by the Korean Ministry of Science and ICT and the Institute of Information & Communications Technology Planning & Evaluation.

2. Description of the Related Art

Recently, with the development of natural language processing technology using deep neural networks, interest in models for knowledge-based visual question answering (VQA) is also increasing. Knowledge-based visual question answering aims to answer questions that require visually-grounded external knowledge beyond image content itself. Answering complex questions that require multi-hop reasoning under weak supervision is considered a challenging problem be no supervision is given so a reasoning process and the high-order semantics of multi-hop knowledge facts need to be captured.

Meanwhile, the ability to perform multi-hop reasoning is important for an artificial intelligence system to perform complex knowledge-based question answering. In question answering methods using conventional models, a human directly performs the process of collecting knowledge information required for reasoning, combing the knowledge and performing reasoning and considers a result to be a correct answer, and then supervised learning is performed. However, when a human directly provides a correct answer to a reasoning process, there is a problem in that the time and cost reduced for data collection are excessively incurred. Accordingly, there is required a basic technology for modeling a reasoning process by itself even in a situation in which the supervision of a reasoning process is not given in knowledge-based question answering.

In connection with this, Korean Patent Application Publication No. 10-2022-0019461, which is a prior art document, proposes a graph neural network-based knowledge graph reasoning model that can utilize not only context information between each node and neighboring nodes, but also context information between neighboring nodes, thereby disclosing a technology for finding correct answers to a variety of complex questions. However, even the conventional technology cannot overcome the problem in which it is complex to encode unique high-order semantics and multi-hop relations present in a knowledge graph.

Therefore, there is a demand for technology for solving the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to propose a reasoning method based on a structural attention mechanism for knowledge-based question answering that, knowledge-based visual question answering, encodes high-order semantics in the form of hypergraphs and learns high-order semantics unique to each of the hypergraphs and high-order associations between the two hypergraphs by using an attention mechanism, thereby being able to improve multi-hop reasoning ability, and a computing apparatus for performing the same.

Another object of the embodiments disclosed herein is to propose reasoning method based on a structural attention mechanism for knowledge-based question answering that can perform strong reasoning by focusing on correct reason evidence under weak supervision by using a hypergraph transformer model, and a computing apparatus for performing the same.

As a technical solution for accomplishing at least any one of the above-described objects, according to an embodiment, there is provided a reasoning method based on a structural attention mechanism for knowledge-based question answering, the reasoning method being performed by a computing apparatus, the reasoning method including: recognizing one or more entities in a query including content and a question, and linking recognized entities to a knowledge base; constructing a question hypergraph and a query-aware knowledge hypergraph by performing a multi-hop graph walk on a question graph and the knowledge base; and inferring a correct answer to the question by applying an attention mechanism to a query hyperedge and a knowledge hype edge included in the question hypergraph and the query-aware knowledge hypergraph, respectively.

According to another embodiment, there is provided a computing apparatus for implementing a hypergraph transformer model and performing reasoning based on a structural attention mechanism for knowledge-based question answering, wherein the hypergraph transformer model includes: an entity linker configured to recognize one or more entities in a query and linking recognized entities to knowledge nodes of a knowledge base; a hypergraph constructor configured to construct a question hypergraph based on a question and also construct a query-aware knowledge hypergraph based on the knowledge base to which the recognized entities are linked; and a transformer model configured to apply an attention mechanism to a query hyperedge and a knowledge hyperedge included in the question hypergraph and the query-aware knowledge hypergraph, respectively.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
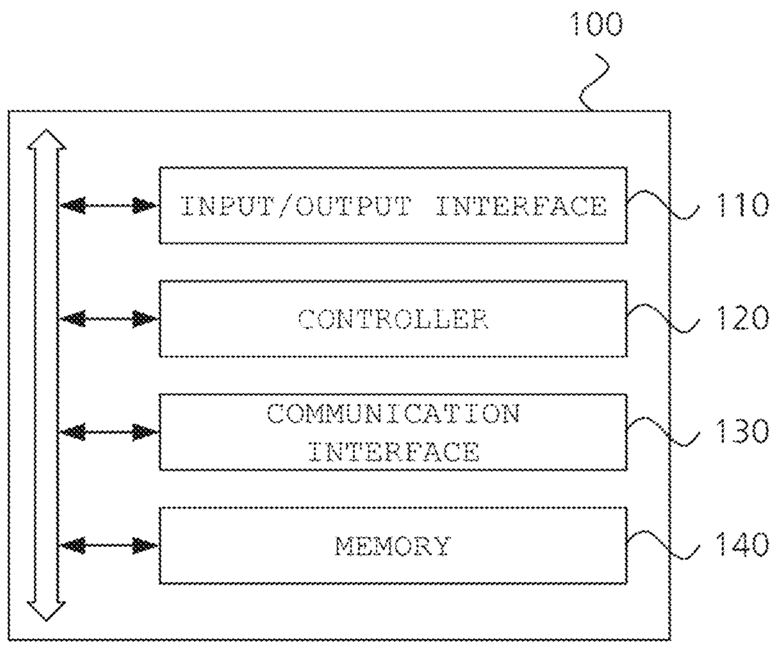
FIG. 1 is a block diagram illustrating a computing apparatus according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

The embodiments described herein relate to a hypergraph transformer model that, in order to perform knowledge-based visual question answering, understands the semantics of a given question, links information appearing in given content to a knowledge graph, extracts information necessary to answer the question from the knowledge graph, combines extracted various evidences, and then performs multi-hop reasoning.

First, the configuration of a computing apparatus for performing a reasoning method based on a structural attention mechanism for knowledge-based question an will be described in brief below. Next, a method by which a computing apparatus performs reasoning using a hypergraph transformer model will be described in detail.

Embodiments will be described in detail below with reference to the accompanying drawings.

FIG. 1 is a block diagram illustrating a computing apparatus 100 according to an embodiment. In this case, the computing apparatus 100 is an apparatus that infers a correct answer by performing reasoning when a question requiring knowledge is given for given content. The computing apparatus 100 may be implemented as an electronic terminal having installed thereon data or programs that can train a hypergraph transformer model or perform reasoning using a hypergraph transformer model, or may be implemented as a server-client system.

In this case, the electronic terminal may be implemented as a computer, a morale terminal, a television, a wearable device, or the like that can access a remote server or connect with another terminal and a server over a network. In this case, the computer includes, e.g., a notebook, a desktop, a laptop, and the like each equipped with a web browser. The mobile terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), Global System for Mobile communications (GSM) terminal, an International Mobile Telecommunication (IMI)-2000 terminal, a Code Division Multiple Access (rDAA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or connect with another terminal directly or via another information processing device over a network.

The server may be Implemented as a computer capable of communicating over a network with an electronic terminal on which an application or web browser for interaction with a user is installed, or may be implemented as a cloud computing server. Furthermore, the server may include a storage device capable of storing data, or may store data via a third server.

Referring to FIG. 1, the computing apparatus 100 according to the embodiment may include an input/output interface 110, a controller 120, a communication interface 130, and memory 140.

The input/output interface 110 is configured to receive content and question data and output a question answering result. Furthermore, the input/output interface 110 may additionally receive a knowledge graph or information necessary to construct or update a knowledge graph. The input/output interface 110 may include an input interface configured to receive input from a user, and an output interface configured to display information such as the result of the performance of a task or the status of the computing apparatus 100. For example, the input interface of the input/output interface 110 may include various types of devices capable of receiving user input such as a keyboard, physical buttons, a touch screen, a camera, and/or a microphone. Furthermore, the output interface may include a display panel, and/or a speaker. However, the input/output interface 110 is not limited thereto, and may include various types of components capable of supporting input/output.

The controller 120 may control the overall operation of the computing apparatus 100, and may include at least one processor such as a central processing unit (CPU). The controller 120 may control other components included in the computing apparatus 100 to perform an operation corresponding to a user input received through the input/output interface 110. For example, the controller 120 may execute a program stored in the memory 140, may read a file stored in the memory 140, or may store a new file in the memory 140. In particular, the controller 120 may implement a hypergraph transformer model to be described later and infer an answer to a question about given content by executing a program stored in the memory 140. In addition, when an answer as well as content and a question are given together, the controller 120 may also train a hypergraph transformer model by using them.

The communication interface 130 may perform wired/wireless communication with another device or a network. To this end, the communication interface 130 may include a communication module configured to support at least one of various wired/wireless communication methods. For example, the communication module may be implemented in the form of a chipset. The communication interface 130 may receive data necessary for reasoning from another device by communicating with the other device. For example, the communication interface 130 may access a knowledge graph provided by another device and infer an answer corresponding to a question about given content. However, this is only an example, and a knowledge graph may be constructed in the memory 140 to be described later according to an embodiment. Meanwhile, the wireless communication supported by the communication interface 130 may be, e.g., Wireless Fidelity (Wi-Fi), Wi-Fi Direct, Bluetooth, Ultra-Wide Band (UWB), or Near Field Communication (NFC). Furthermore, the wired communication supported by the communication interface 130 may be, e.g., Universal Serial Bus (USB), or High Definition Multimedia Interface (HDMI).

Various types of data such as data, data sets, files, and programs may be installed on and stored in the memory 140. The controller 120 may access and use data stored in the memory 140, or may store new data in the memory 140. Furthermore, the controller 120 may execute a program installed on the memory 140. The memory 140 may store data or a program necessary to implement a hypergraph transformer model for performing reasoning based on a structural attention mechanism for knowledge-based question answering. Furthermore, according to an embodiment, a knowledge graph based on which reasoning is performed using a hypergraph transformer model may be constructed in the memory 140.

A process in which the controller 120 implements a hypergraph transformer model by executing a program stored in the memory 140 and infers an answer to a question for given content using the hypergraph transformer model will be described in detail below.

Figure 2:
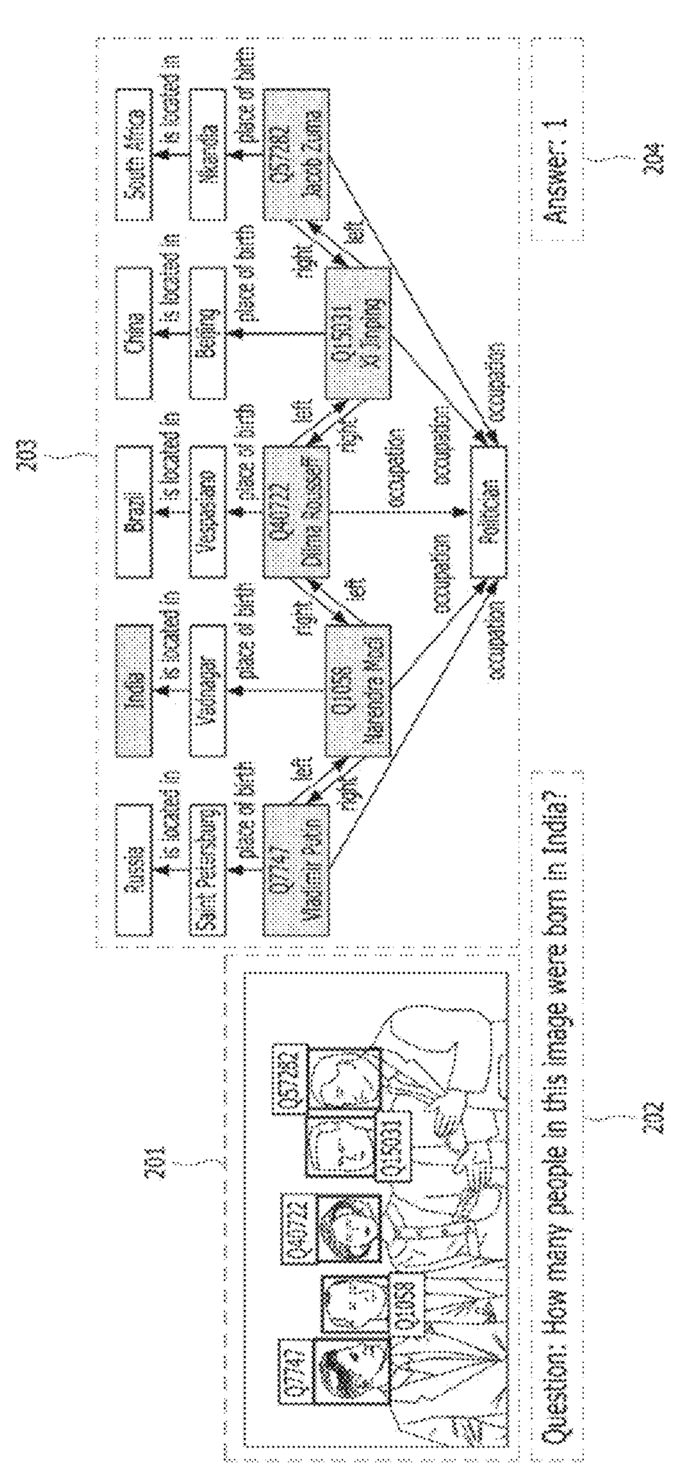
FIG. 2 is an exemplary diagram illustrating a knowledge-based visual question answering problem.

First, a knowledge-based visual question answering problem will be described with reference to FIG. 2. FIG. 2 is an exemplary diagram illustrating a knowledge-based visual question answering problem.

For a knowledge-based visual question answering problem to be dealt with in embodiments to be described below, content 201, a question 202 about the content, and a knowledge base 203 are given as inputs. In this case, although one image, which is visual content, is presented as an example of the content 201, the content 201 does not necessarily have to be an image and may be in the form of text. Hereinafter, the term "query" is used as a term that refers to a data pair including the content 201, which is a question target, and the question 202.

Meanwhile, the knowledge base 203 includes not only knowledge about input content but also various pieces of world knowledge or common sense knowledge, and may have characteristics in which the amount of knowledge is considerably large and connection relations in a graph are sparse. Accordingly, the knowledge base 203 shown in FIG. 2 represents a subset of a knowledge base that is actually implemented. The knowledge base 203 is a graph-type knowledge structure that is represented by nodes symbolizing respective entities, as shown in box forms in the drawing, and edges indicating connection relations between the nodes.

In addition, in order to infer an answer to a question from the knowledge base 203 in relation to entities recognized in the given content 201, e.g., objects, attributes, and persons, multi-hop reasoning capability is required as being indicated by the gray boxes in the knowledge base 203 shown in FIG. 2.

Figure 3:
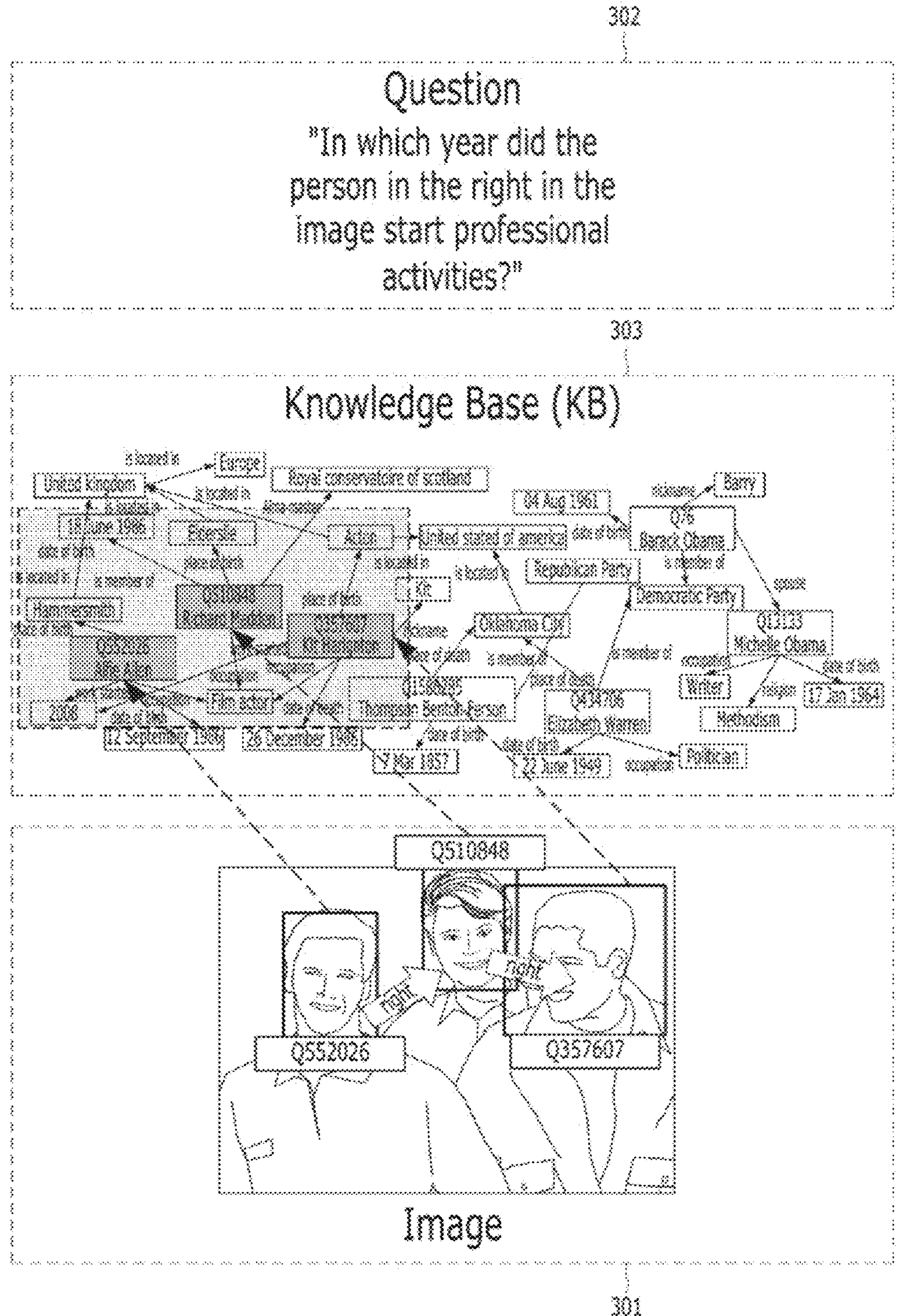
FIG. 3 and FIG. 4 are exemplary diagrams showing the structure of a hypergraph transformer model according to an embodiment.
Figure 4:
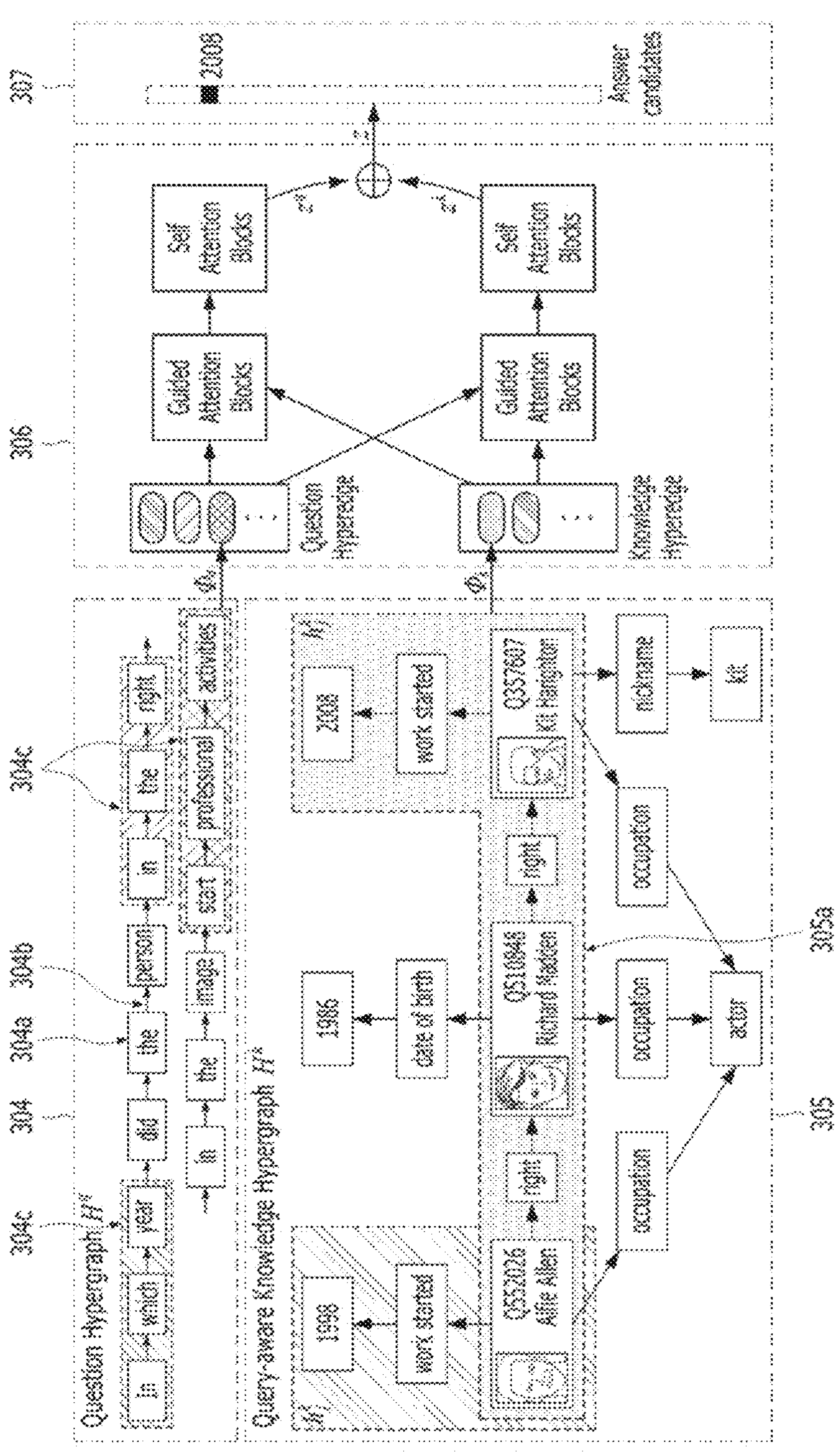

Therefore, in one embodiment, information about entities appearing on visual content is found in a knowledge base through a hypergraph transformer model having the structure illustrated as an example in FIGS. 3 and 4, and then a correct answer is inferred by paying attention to the knowledge that is important evidence for reasoning in the former information. Referring to FIGS. 3, 4 and 4, a hypergraph transformer model according to an embodiment and the detailed operation of the controller 120 for implementing the hypergraph transformer model and performing reasoning will be described below.

Figure 5:
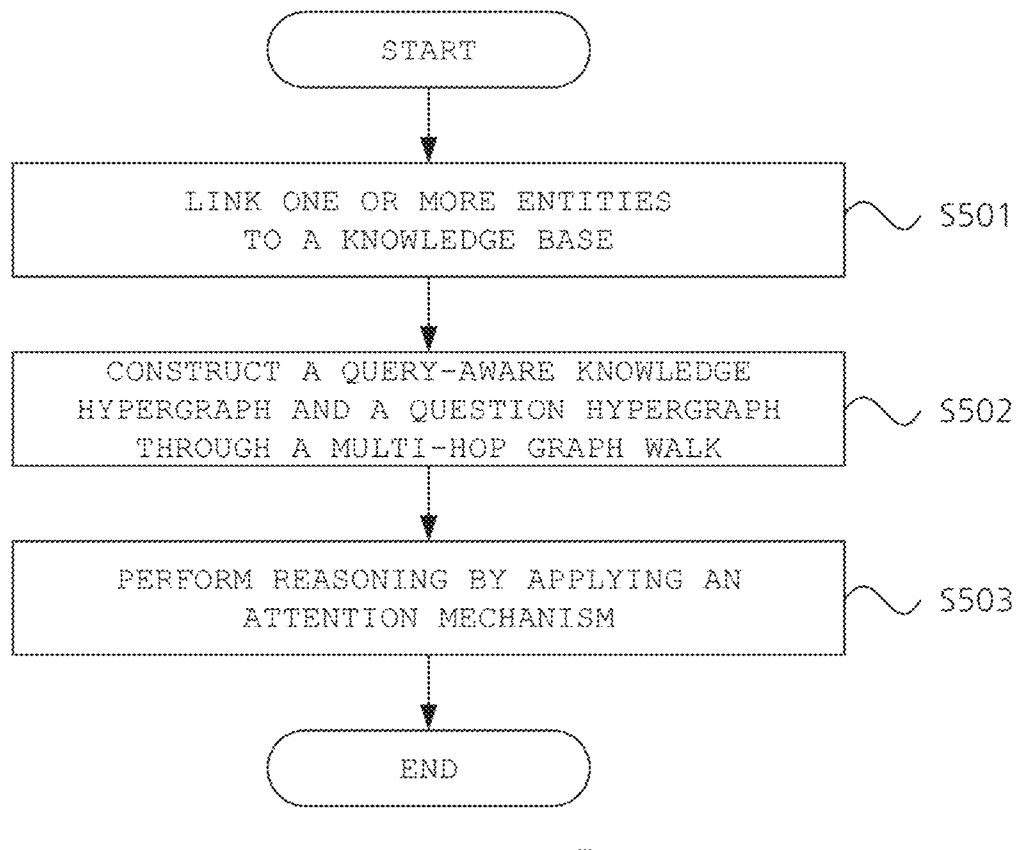
FIG. 5 is a flowchart illustrating a reasoning method based on a structural attention mechanism for knowledge-based question answering according to an embodiment in a stepwise manner.

FIGS. 3 and 4 are exemplary diagrams showing the structure of a hypergraph transformer model according to an embodiment, and FIG. 5 is a flowchart illustrating a reasoning method based on a structural attention mechanism for knowledge-based question answering according to an embodiment in a stepwise manner. First, the structure of the hypergraph transformer model is described in brief with reference to FIGS. 3 and 4, and then the reasoning method performed by the controller 120 of the computing apparatus 100 will be described in detail with reference to FIG. 5.

As shown in FIGS. 3 and 4, the hypergraph transformer model implemented by the computing apparatus 100 constructs a question hypergraph 304 and a query-aware knowledge hypergraph 305 based on given content 301, a question 302, and a knowledge base 303. Accordingly, the hypergraph transformer model may include an entity linker configured to link one or more entities, recognized in a query including the content 301 and the question 302, to the knowledge base 303 based on the query. In this case, the entity linker may include a model configured to recognize one or more objects in an image in order to recognize the entities in the query as described above.

Meanwhile, the hypergraph transformer model may include a hypergraph constructor configured to search for entities to be included in each hypergraph and entities to constitute hyperedges by performing a multi-hop graph walk on a question graph or the knowledge base 303 and then construct hypergraphs 304 and 305. Accordingly, it may be possible to supply input representations based on the hypergraphs to a transformer model 306, which will be described later.

Furthermore, the hypergraph transformer model may include the transformer model 306 configured to apply an attention mechanism to input representations based on hypergraphs. The transformer model 306 will be described in more detail below, and may include a guide attention block and a self-attention block and further include a correct answer predictor configured to predict a correct answer to a question by using a finally output representation.

Accordingly, using the hypergraph transformer model, a final correct answer 307 may be predicted for the question 302 related to the content 301 based on the knowledge base 303.

In order to infer a correct answer by implementing the hypergraph transformer model described above, the controller 120 of the computing apparatus 100 links entities, recognized in the pair of the content 301 and the question 302, i.e., a query, to the knowledge base 303, as shown in FIG. 5, at step S501. For example, in FIGS. 3 and 4, one or more entities, e.g., one or more objects, one or more attributes, and/or one or more persons, may be recognized from the content 301 or the question 302. Furthermore, the controller 120 may link the recognized entities to the knowledge graph as nodes.

In this case, the content 301 may be composed of an image or text. As illustrated in FIG. 3, when the content 301 is an image, the controller 120 may search for a visual object, e.g., the face of a person, appearing in the image, by using a pre-trained model for the identification of the object, and may recognize the person as one of the persons registered as entities in the knowledge base 303. Furthermore, the controller 120 may search the knowledge base 303 for a knowledge node corresponding to the recognized person, and may link the entity of the recognized person to the found node. For example, in FIG. 3, nodes corresponding to three respective persons recognized in the content 301 may be searched for in the knowledge base 303, and corresponding entities for the persons may be linked to the three found nodes. Furthermore, in this case, the three person entities may be linked by edges indicative of an arrangement order so that the respective person entities corresponding to the three found nodes can indicate the arrangement order in the content 301. For example, as shown in FIG. 3, individual person entities may be linked by edges having information indicative of a direction such as "right."

Meanwhile, as described above, in order to recognize one or more entities in an image and link them to the knowledge base 303, the controller 120 may perform a face recognition process of searching for one or more human entities in an image and inferring labels. In this case, the pre-trained model may be a RetinaFace model for face detection, an ArcFace model for facial feature extraction, or the like.

Meanwhile, when the content 302 is given in the form of text such as a sentence or a paragraph, the controller 120 may perform a text entity linking process of linking an entity appearing in text to the know sedge base 303.

Meanwhile, as shown in FIG. 5, following step 3501, the controller 120 may construct a query-aware knowledge hypergraph and a question hypergraph through a multi-hop graph walk at step S502. To construct a hypergraph, the controller 120 extracts necessary information from the question graph and the knowledge base through a multi-hop graph walk. In this case, the question graph is structured by defining nodes 304*a* for respective words of the question 302 and assuming that there are edges 304*b* for adjacent nodes. For example, in the question hypergraph 304 shown in FIG. 4, a state in which hyperedges 304*c* are not expressed may correspond to a question graph.

The knowledge base 303 includes a vast amount of general knowledge facts, and contains not only knowledge facts required to answer a given question but also unnecessary knowledge facts. Accordingly, the controller 120 constructs a query-aware knowledge hypergraph in order to extract related knowledge facts for answering the given question 302. In this case, the query-aware knowledge hypergraph may be represented by $\mathcal{H}^k=\{\mathcal{V}^k, \varepsilon^k\}$. In this case, $\mathcal{V}^k$ denotes a set of nodes, $\varepsilon^k$ denotes a set of hyperedges, and the query-aware hypergraph $\mathcal{H}^k$ may be composed or $\mathcal{V}^k$ and $\varepsilon^k$. In this case, each hyperedge becomes a subset of the set of nodes $\mathcal{V}^k$.

The controller 120 performs a graph walk in the knowledge base 303 and searches for knowledge facts for inferring an answer to a question. Such a graph walk may start from a node to which an entity recognized in a query is linked (hereinafter referred to as the "starting node") and be performed for all entity nodes linked to the starting node. For example, in FIGS. 3 and 4, a graph walk may start from a node corresponding to each person recognized in the content 301 and then traverse all other nodes linked to the node corresponding to the person.

Figure 6:
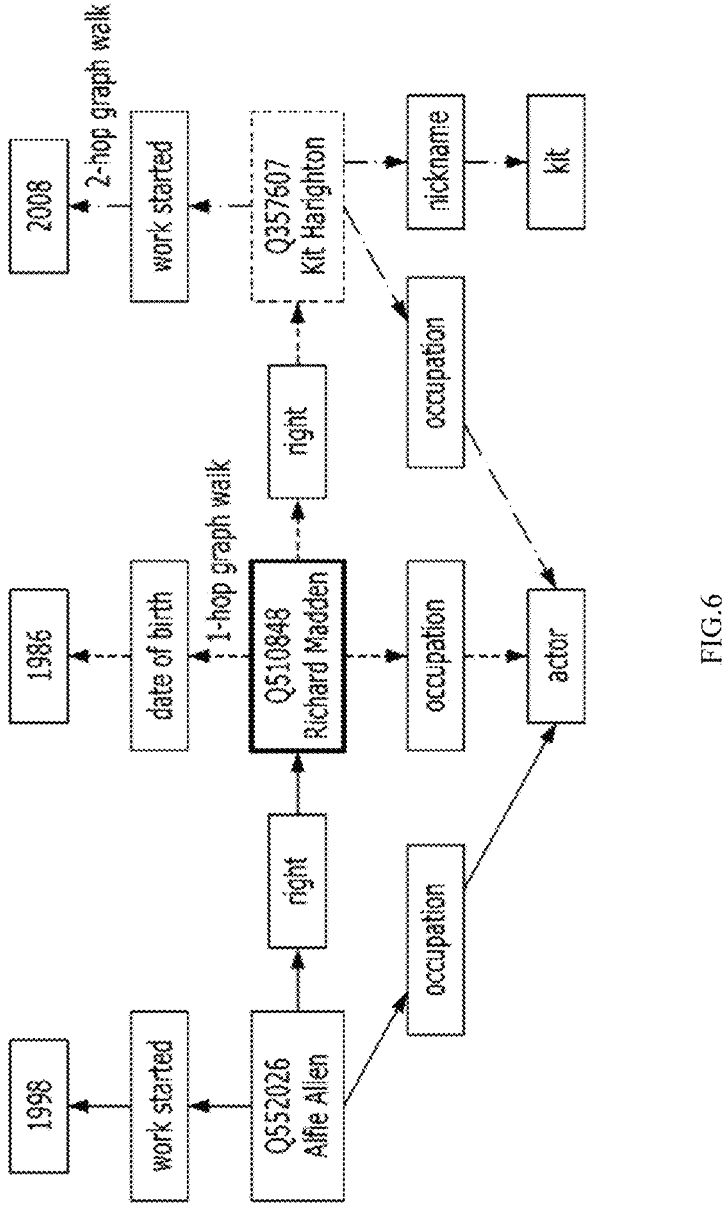
FIG. 6 is an exemplary diagram illustrating a multi-hop graph walk.

In this case, the controller 120 may perform a graph walk on a per-triplet basis. In the knowledge base 303, a node representing a relation between two entities is expressed between nodes representing the entities. Accordingly, these are considered to be one hyperedge composed of {subject-relation-object}, and a graph walk may be performed on every three-node basis. For example, a description will be given based on the knowledge base illustrated in FIG. 6. In this case, FIG. 6 is an exemplary diagram illustrating a multi-hop graph walk. When a graph walk is performed from the node indicated by the box drawn with thick lines in FIG. 6, a graph walk indicated by the dot line arrows corresponds to 1 hop, and a graph walk indicated by the alternated dot and dash line arrows corresponds to 2 hops. Therefore, the node indicated by the dot line box corresponds to an entity found through a 1-hop graph walk, and the arrival node of the 1-hop graph walk becomes the starting node of a 2-hop graph walk again. As described above, the controller 120 links various knowledge facts through a per-triplet multi-hop graph walk, so that an n-hop graph walk may combine n knowledge facts into one hyperedge. For example, taking the hyperedge 305*a* surrounded by the dotted line in the query-aware knowledge hypergraph 305 in FIG. 4 as an example, the controller 120 may use an entity corresponding to "Alfie Allen" as a starting node, may search for an entity corresponding to "Richard Madden" through a 2-hop graph walk, and may then search for an entity corresponding to "Kit Harington" through a 2-hop graph walk. Furthermore, a node corresponding to the year "2008" may be found through a 3-hop graph walk. As described above, knowledge facts corresponding to the three nodes found through a 3-hop graph walk from the starting node may be combined into one hyperedge. Meanwhile, such a graph walk may be performed in a non-probabilistic manner in which all edges linked to the knowledge base 303 are taken into consideration.

The controller 120 constructs a query-aware knowledge hypergraph composed of nodes extracted through such a multi-hop graph walk. In this case, nodes between the starting node and the tail node of each multi-hop graph walk may be set as one hyperedge that are distinguished from other hyperedges.

Meanwhile, the controller 120 may convert a question into a question hypergraph $\mathcal{H}^q$ consisting of a node set $\mathcal{V}^q$ and a hyperedge set $\varepsilon^q$. In this case, the "question hypergraph" may be constructed by setting a hyperedge corresponding to a subset of a set of nodes included in a question graph in such a manner as to perform a graph walk with each word set as the starting node of the graph walk in a question graph structured by defining nodes for respective words of the question 302 and assuming that there are edges for adjacent nodes. The controller 120 may consider a word sequence, recognized as a phrase by an n-gram model, to be a hyperedge of the question hypergraph. For example, in the question hypergraph 304 illustrated in FIG. the controller 120 may set the phrase "In which year" or "in the right" as the hyperedge 304*c*.

As described above, when the query-aware knowledge hypergraph and the question hypergraph are constructed in step S502, the controller 120 then performs reasoning by applying an attention mechanism in step S503. More specifically, the controller 120 applies an attention mechanism in order to take into consideration the inter-association and intra-association between the knowledge hyperedge in the query-aware knowledge hypergraph and the question hyperedge in the question hypergraph. This may be interpreted as performing structural semantic matching to take into consideration high-order semantic associations between the two hypergraphs.

The controller 120 represents word tokens included in each hyperedge as a dense representation by applying a word embedding matrix, and forms one vector representation by linking words included in each hyperedge and applying a single forward neural network. Thereafter, the controller 120 passes the query hyperedge and the knowledge hyperedge converted into a vector representation through the transformer model 306 composed of a guided-attention blocks and self-attention blocks using the scaled-dot product attention operation in order to measure the inter-association and intra-association between the two hyperedges. As a result, a final representation in which the inter-association and the intra-association are taken into consideration is ultimately obtained.

To this end, as shown in FIG. 4, the controller 120 learns the inter-associations between knowledge and question hyperedges with an inter-attention mechanism by using the guided-attention blocks, and then learns the intra-relationships of the knowledge and question hyperedges by using the self-attention blocks.

Figure 7:
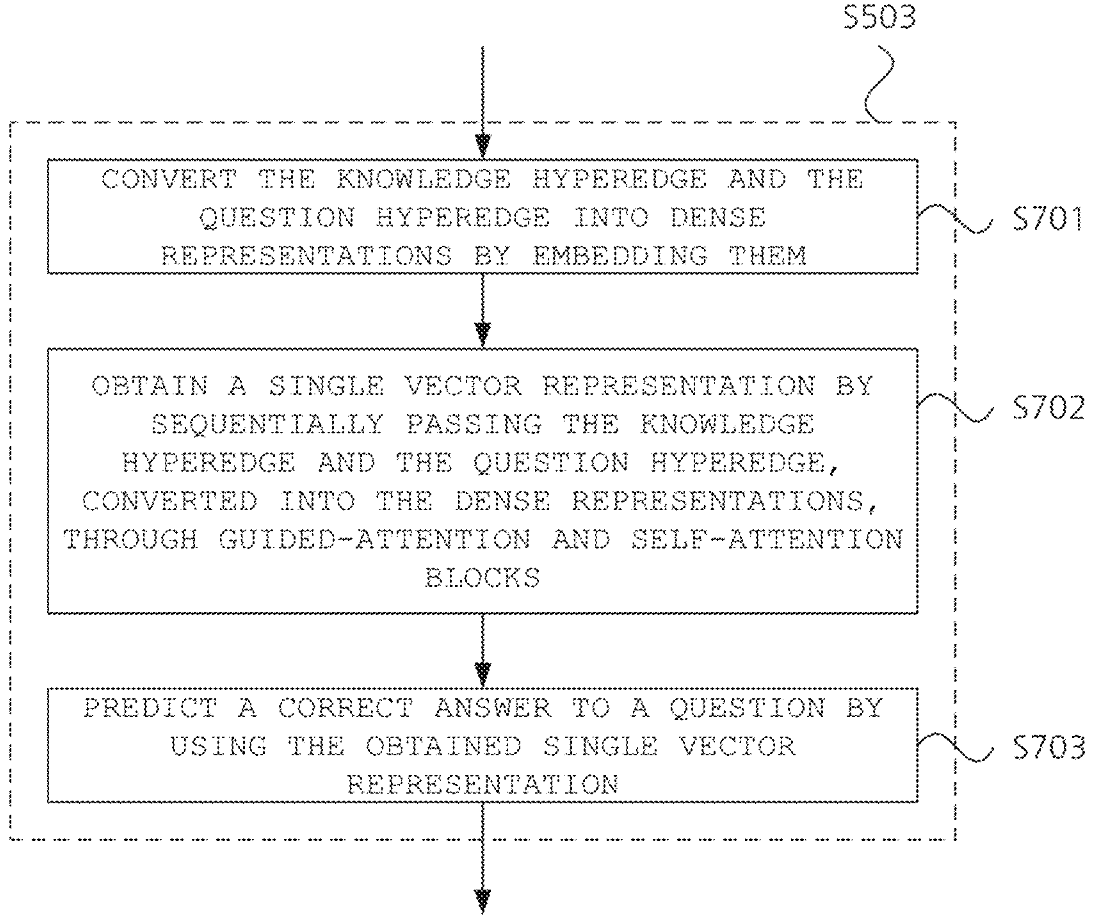
FIG. 7 is a flowchart more specifically illustrating step S503 of the reasoning method based on a structural attention mechanism for knowledge-based question answering according to the embodiment shown in FIG. 5.
Figure 8:
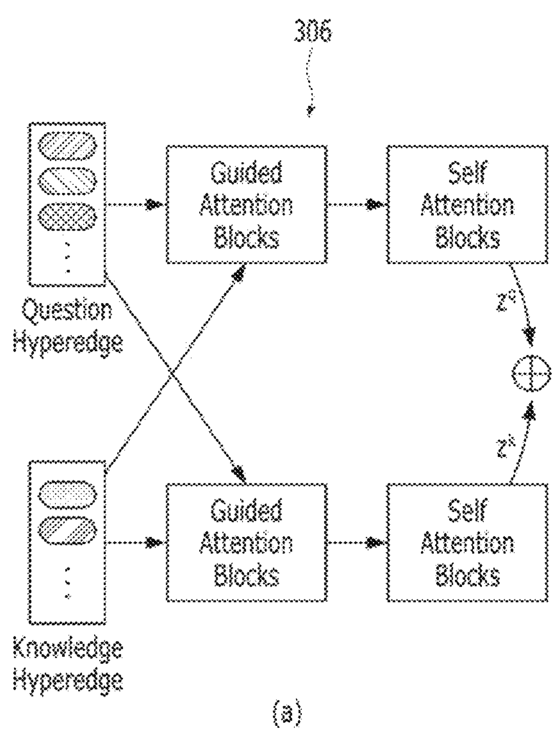
FIG. 8 is a diagram illustrating the structure of a transformer model according to an embodiment.
Figure 8:
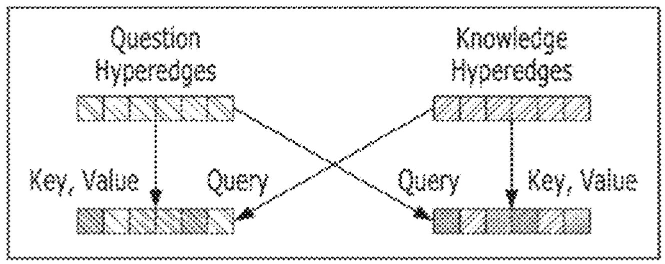
Figure 8:
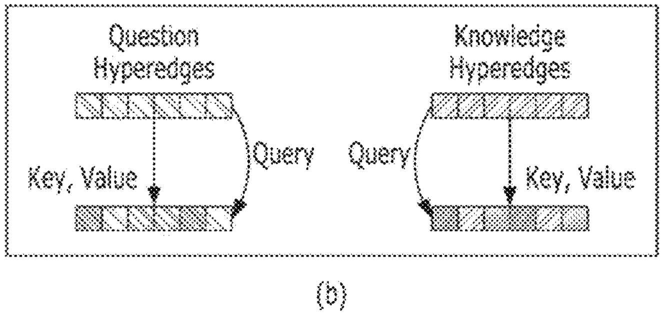

Detailed descriptions will be given with reference to FIGS. 7 and 8. FIG. 7 is a flowchart specifically illustrating step S503 of the reasoning method based on a structural attention mechanism for knowledge-based question answering according to the embodiment shown in FIG. 5, and FIG. 8 is a diagram illustrating the structure of a transformer model according to an embodiment.

In step S503 of the embodiment shown in FIG. 5, the controller 120 first embeds the individual hyperedges as follows in order to learn the inter-association between the question hyperedge and the knowledge hyperedge by using the transformer model 306 in step S701.

$$e^k=\phi_k \circ f_k(h^k) \in \mathbb{R}^d, e^q=\phi_q \circ f_q(h^q) \in \mathbb{R}^d$$

In the above equations, $h^{[\cdot]}$ is a hyperedge that belongs to a hyperedge set $\varepsilon^{[\cdot]}$. In this case, $f_{[\cdot]}$ is a hyperedge embedding function, and $\phi_{[\cdot]}$ is a linear projection function. In this case, although the hyperedge embedding function $f_{[\cdot]}$ may be designed and implemented as, e.g., any pooling operation or any learnable neural networks, it is not limited thereto. In an embodiment, a simple concatenation operation of node representations in a hyperedge may be used as the hyperedge embedding function $f_{[\cdot]}$. The representations of knowledge hyperedges belonging to the query-aware knowledge hypergraph are aggregated into a matrix $E^k$, and the representations of question hyperedges belonging to the question hypergraph are packed together into a matrix $E^q$. The knowledge hyperedges $E^k$ and the question hyperedges $E^q$ are defined as a query and key-value pairs, respectively. More specifically, a query $Q_k=E^k W_{Q_k}$, a key $K_q=E^q W_{K_q}$, and a value $V_q=E^q W_{V_q}$ are defined, and all projection matrices $W_{[\cdot]} \in \mathbb{R}^{d \times d_v}$ are learnable parameters.

In addition, in step S702, the controller 120 calculates a scaled-dot product attention using the query, the key, and the value as Attention $$(Q_k, K_q, V_q) = \text{softmax}\left(\frac{Q_k K_q^T}{\sqrt{d_v}}\right)V_q.$$

In this case, $d_v$ is the dimension of the query and the key vector. In addition, guided-attention using the question hyperedge as a query and also using the knowledge hyperedge as a key-value pair is performed in a similar manner for Attention $(Q_q, K_k, V_k)$.

Meanwhile, as shown in (a) of FIG. 8, the self-attention Performed by the transformer model 306 differs from the above-described guided-attention only in that the same inputs are used for both a query and a key-value pair within the self-attention. For example, the query, the keys, and the value may be set based on the knowledge hyperedge $E^k$, and self-attention for the knowledge hyperedge may be performed by Attention $(Q_k, K_k, V_k)$. For the query hyperedge $E^q$, self-attention is performed in a similar manner by Attention $(Q_q, K_q, V_q)$.

Each of the guided-attention and self-attention blocks included in the transformer model 306 may consist of each attention operation having layer normalization, residual connection, and a single feed-forward layer according to the standard structure of the transformer model. By passing through the guided-attention and self-attention blocks sequentially, as shown in (b) of FIG. 8, the representations of the knowledge and question hyperedges are updated and finally aggregated into a single vector representation of $z_k \in \mathbb{R}^{d_v}$ and $z_q \in \mathbb{R}^{d_v}$.

Meanwhile, as shown in FIG. 7, the controller 120 predicts a correct answer to the question by using the single vector representation of the knowledge and question hyperedges obtained using the guided-attention and self-attention blocks in step S703. To this end, the controller 120 may use, e.g., a similarity-based answer predictor or a multi-layer perceptron. The similarity-based answer predictor selects an answer representation most similar to a final representation as a correct answer, and the multi-layer perceptron selects a correct answer having the highest probability of a correct answer by performing learning in such a manner as to classify one of correct answer candidates based on a final representation.

More specifically, in step S703, in order to predict a correct answer to the question, the controller 120 obtains a joint representation z by concatenating $z_k$ and $z_q$, i.e., final representations obtained from the attention blocks, and then inputting the result of the concatenation to a single feed-forward layer, i.e., $\mathbb{R}^{2d_v} \mapsto \mathbb{R}^w$. In this case, the controller 120 may use the two types of correct answer predictors as described above. The multi-layer perceptron is an answer classifier p=ψ(z), which is widely used in visual question answering problems. In the case of the similarity-based answer predictor, a dot product similarity $p=zC^T$ between z and an answer candidate set $C \in \mathbb{R}^{|\mathcal{A}| \times w}$ is calculated. In this case, $|\mathcal{A}|$ is the number of answer candidates, and w is the dimension of the representation for each answer candidate. The candidate most similar to the joint representation z may be selected as a correct answer from among correct answer candidates. For the training of the transformer model 306, the controller 120 may only supervise question-answer pairs without annotating ground-truth reasoning paths. To this end, the cross entropy between the prediction p and a ground-truth answer may be used as a loss function. In this case, the ground-truth correct answer is a value given as a correct answer to a question for the learning of the transformer model 306.

Through the above-described process, the controller 120 may perform visual question answering based on the knowledge base.

Meanwhile, a specific embodiment of a reasoning method based on a structural attention mechanism for knowledge-based question answering performed by the above-described computing apparatus 100 will be described below.

Table 1 below is a table showing the comparison between quantitative differences in performance between conventional question answering models and a hypergraph transformer model according to an example.

and ArcFace (Deng et al., 2019), were used. A similarity-based answer predictor was used in the embodiment, and a multi-layer perceptron was used in the comparative examples. In the example, Adam (Kingma and Ba, 2015) was adopted to optimize all learnable parameters. Furthermore, in order to evaluate the pure reasoning ability of each model regardless of entity linking performance in the example and the comparative examples, experiments were conducted in an Oracle environment in which entities denominated as real names in an image were given.

Referring to Table 1 above, it can be seen that as a result of performing question answering using the example, i.e., the hypergraph transformer model, results that outperform those of the recent models corresponding to the comparative examples were output. From these results, it was confirmed that applying the attention mechanism to the hyperedges extracted from the hypergraphs contributed to improving the accuracy of the results of the question answering. Since GCM (Kipf and Welling, 2017) and GGNN (Li et al., 2016) encode questions and knowledge graphs separately, they do not learn interactions between questions and knowledge. Therefore, CCN and GGNN exhibit considerably low performance under 74% mean accuracy.

Meanwhile, the results of experiments conducted on PathQuestion (PQ) and PathOuestion-Large (PQL) to verify the multi-hop reasoning ability of the hypergraph transformer model according to the example will be described below. The PQ and PQL data sets were provided with annotations of actual reasoning paths to answer a given

TABLE 1

| | Model | Original (ORG) 1-hop | Original (ORG) 2-hop | Original (ORG) 3-hop | Paraphrased (PRP) 1-hop | Paraphrased (PRP) 2-hop | Paraphrased (PRP) 3-hop | Mean |
|---|---|---|---|---|---|---|---|---|
| Comparative Examples | BLSTM | — | — | — | — | — | — | 51.0 |
| | MemNN (Sukhbaatar et al., 2015) | — | — | — | — | — | — | 59.2 |
| | GCN (Kipf and Welling, 2017) | 65.7 | 67.4 | 66.9 | 65.8 | 67.5 | 67.0 | 66.7 |
| | GGNN (Li et al., 2016) | 72.9 | 74.5 | 74.0 | 72.9 | 74.6 | 74.1 | 73.8 |
| | MemNN† (Sukhbaatar et al., 2015) | 78.1 | 77.8 | 76.1 | 78.0 | 78.1 | 76.0 | 77.3 |
| | HAN (Kim et al., 2020) | 77.5 | 77.5 | 77.2 | 77.1 | 77.4 | 76.9 | 77.3 |
| | BAN (Kim et al., 2018) | 83.5 | 84.0 | 83.7 | 83.7 | 84.3 | 83.8 | 83.8 |
| | Example | 88.1 | 90.2 | 91.0 | 87.8 | 90.5 | 90.7 | 89.7 |

Each node in the knowledge hypergraph and the question hypergraph was represented as a 300-dimensional vector (i.e., w=300) initialized using GloVe (Pennington et al., 2014). Random initialization was applied when a word for a node was not present in the vocabulary of GloVe. Mean pooling was applied when a node consisted of multiple words. For entity linking in the question answering method according to the embodiment, well-known pre-trained models for face recognition, e.g., RetinaFace (Deng et al., 2020)

question. More specifically, {PQ, PQL}-{2H, 3H} denotes the split of PQ and PQL with respect to the number of hops in ground-truth reasoning paths (i.e., 2-hop or 3-hop). {PQ, PQ}-M is used to evaluate a more general scenario in which 2-hop and 3-hop questions from both data sets are mixed and the number of reasoning paths required to answer a given question is unknown. The experimental results for the diverse splits of PQ and PQL datasets are shown in Table 2 below:

TABLE 2

| | PathQuestion PQ-2H | PathQuestion PQ-3H | PathQuestion PQ-M | PathQuestion-Large PQL-2H | PathQuestion-Large PQL-3H | PathQuestion-Large PQL-M |
|---|---|---|---|---|---|---|
| Seq2Seq (Sutskever et al., 2014) | 89.9 | 77.0 | — | 71.9 | 64.7 | — |
| MemNN (Sukhbastar et al., 2015) | 89.5 | 79.2 | 86.8 | 61.2 | 53.6 | 55.8 |
| KV-MemNN (Miller et al., 2016) | 91.5 | 79.4 | 85.2 | 70.5 | 63.4 | 68.6 |
| IRN (Zhou et al., 2018) | 96.0 | 87.7 | — | 72.5 | 71.0 | — |
| Embed (Bordes et al., 2014b) | 78.7 | 48.3 | — | 42.5 | 22.5 | — |
| Subgraph (Bordes et al., 2014a) | 74.4 | 50.6 | — | 50.0 | 21.3 | — |
| MINERVA (Das et al., 2018) | 75.9 | 71.2 | 73.1 | 71.8 | 65.7 | 66.9 |

TABLE 2-continued

| | PathQuestion | | | PathQuestion-Large | | |
|---|---|---|---|---|---|---|
| | PQ-2H | PQ-3H | PQ-M | PQL-2H | PQL-3H | PQL-M |
| IRN-weak (Zhou et al., 2018) | 91.9 | 83.3 | 85.8 | 63.0 | 61.8 | 62.4 |
| SRN (Qiu et al., 2020) | 96.3 | 89.2 | 89.3 | 78.6 | 77.5 | 78.3 |
| Example | 96.4 | 90.3 | 89.5 | 90.5 | 77.9(*) | 94.5 |

The first section of Table 2 lists fully-supervised models that require annotations of ground-truth reasoning paths as additional supervision. The second section contains weakly-supervised models that learn to infer multi-hop reasoning paths without annotations of ground-truth reasoning paths. The hypergraph transformer model according to the example is included in weakly-supervised models because it utilizes only an answer for supervision. The example exhibited performance W on PQ-{2H, 3H, M} similar to that of SRN, which was a state-of-the-art weakly-supervised model. In particular, the hypergraph transformer model exhibited significant performance improvements for PQL. For example, performance improvements of 78.6%→90.5% for PQL-2H and 78.3%→94.5% for PQL-M were exhibited. PQL is a more challenging dataset than PQ in that PQL not only covers more knowledge facts, but also has fewer question answering instances.

Meanwhile, in the hypergraph transformer model according to the example, comparative experiments were conducted to analyze the effectiveness of input representations based on hypergraphs. In this case, two types of input formats, i.e., a single-word unit and hyperedge-based representations, were taken into consideration. Compared to hyperedge-based inputs taking into consideration multiple relational facts as input tokens, a single-word unit used all entities and relational tokens as separate input tokens. While the use of a single-word unit-based input format for both knowledge and questions was a standard setting for transformer networks, the example used a hyperedge-based input format for both knowledge and questions. Transformer (SA+GA) was set as a backbone model, and the results of the experiments are shown Table 3 below:

TABLE 3

| | Inputs | | Original (ORG) | | | Paraphrased (PRP) | | | |
|---|---|---|---|---|---|---|---|---|---|
| Model | Knowledge | Question | 1-hop | 2-hop | 3-hop | 1-hop | 2-hop | 3-hop | Mean |
| (a) SA | Word | Word | 79.4 | 79.6 | 77.6 | 77.1 | 77.7 | 77.7 | 78.2 |
| (b) SA + GA | Word | Word | 80.9 | 82.3 | 81.5 | 80.7 | 82.2 | 81.8 | 81.6 |
| (c) SA + GA | Word | Hyperedge | 82.1 | 84.2 | 82.8 | 81.1 | 83.5 | 82.3 | 82.7 |
| (d) SA + GA | Hyperedge | Word | 87.0 | 89.9 | 88.9 | 87.3 | 89.7 | 89.2 | 88.7 |
| (e) SA + GA (Ours) | Hyperedge | Hyperedge | 88.1 | 90.2 | 91.0 | 87.8 | 90.5 | 90.7 | 89.7 |
| (f) Ours − SA | Hyperedge | Hyperedge | 85.2 | 88.8 | 88.3 | 85.0 | 88.3 | 88.4 | 87.1 |
| (g) Ours − GA | Hyperedge | Hyperedge | 82.6 | 83.6 | 85.0 | 82.7 | 83.6 | 84.9 | 83.7 |

Referring to (a) to (e) of Table it can be seen that, when hyperedges, which were hypergraph-based representations, were used for both knowledge and questions, experimental results showed the best performance for question types (ORG and PRP) and graphs walks (1-hop, 2-hop and 3-hop) at different levels in all settings. As can be seen in Table 3, the mean accuracy of the question answering was 89.7% when both knowledge and questions were encoded using hyperedges, whereas performance was relatively low at 81.6% when single-word unit-based representations were used. In particular, when the hyperedge representations of knowledge and questions were converted into single-word unit-based representations, the mean accuracies of question answering were 82.7% and 88.7%, respectively. These results indicate that the embedding of not only knowledge but also question as hypergraph-based representations is meaningful. For reference, in the table above, SA denotes self-attention, and GA denotes guided-attention.

Meanwhile, referring to (e) to (g) of Table 3, the impacts of each attention block on the accuracy of question answering will now be discussed. When either guided-attention or self-attention (SA) was removed, scores was decreased in all settings. In particular, the mean accuracies of question answering were decreased by 6.0% (89.7%→83.7%) and 2.6% (89.7%→87.1%), respectively, when guided-attention and self-attention blocks were removed. Based on these experiments, can be confirmed that not only the guided-attention that captures the inter-relationships between questions and knowledge, but also the self-attention that learns the intra-relationships within them are important to complex question answering. As described above, it can be seen that due to the two characteristics of using hypergraph-based input representations for both knowledge and questions and learning the intra-relationships of knowledge and questions while learning the inter-relationships between knowledge and questions, the example focusing on the evidences required for reasoning under weak supervision exhibits better reasoning performance.

Figure 9:
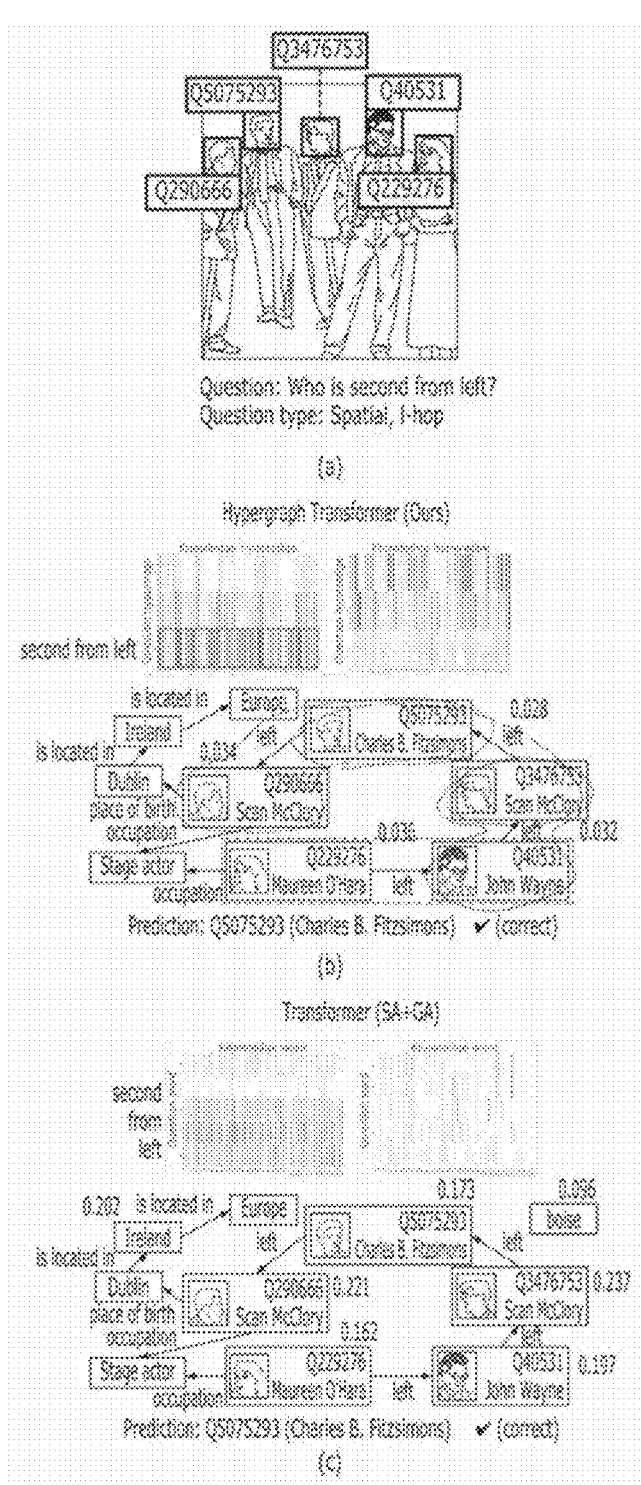
FIG. 9 and FIG. 10 are exemplary diagrams illustrating the qualitative effect of a hypergraph transformer model.
Figure 10:
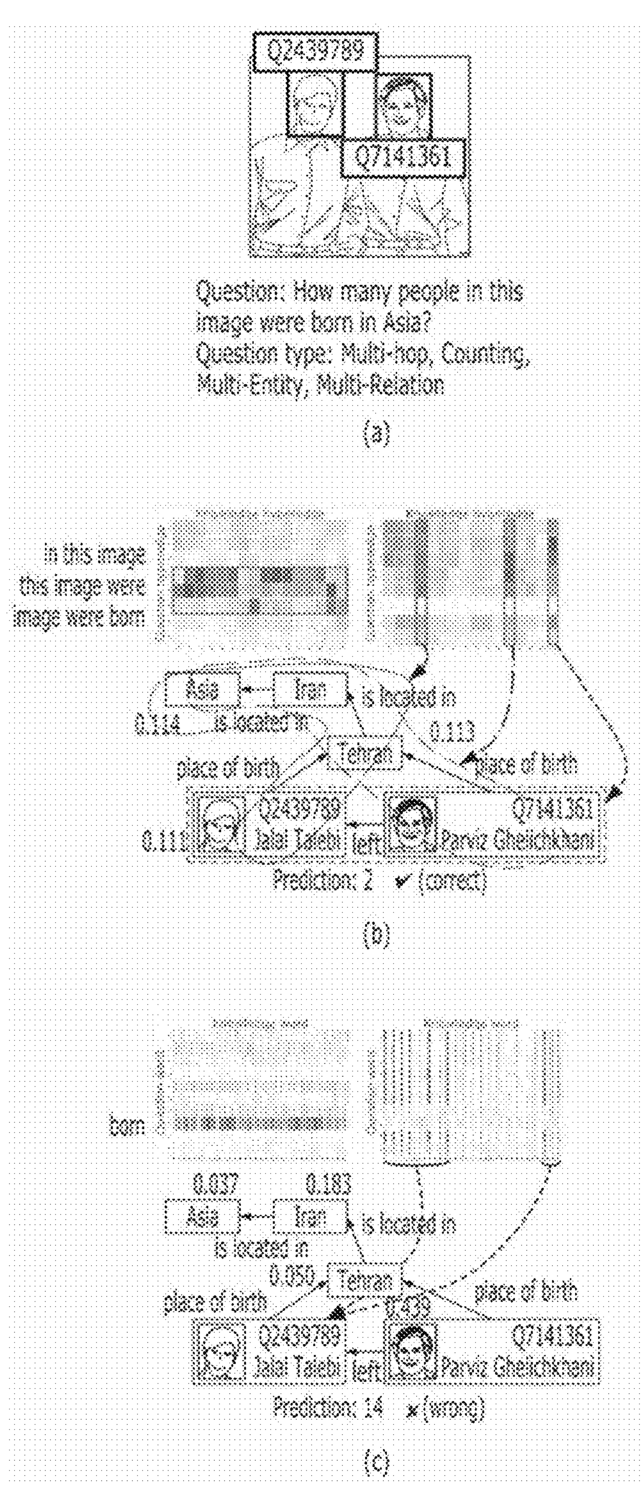

In the following, the results of qualitative analysis on the effectiveness that is obtained when hypergraphs are used as input representations of the transformer model will be described with reference to FIGS. 9 and 10. FIGS. 9 and 10 are exemplary diagrams illustrating the qualitative effect of a hypergraph transformer model.

In FIGS. 9 and 10, attention maps for the hypergraph transformer model according to the embodiment and a model (a transformer (SA+GA)) performing self-attention and guided-attention as another transformer model are visualized. All attention scores are averaged over multiple heads and multiple layers. The x- and y-axes represent the indices of question and knowledge hyperedges in the hypergraph transformer model and the indices of question and knowledge words in the transformer (SA+GA). In these attention maps, dark colors represent high values, and hyperedges having high attention scores are visualized.

In the first example shown in FIG. 9, both the hypergraph transformer model and the transformer (SA+GA) model inferred the correct answer Q5075293. In FIG. 9, the hypergraph transformer model responded by focusing on the {second≤from≤left} phrase of the question and four knowledge facts having a relation of "left" among 86 knowledge hyperedges. In contrast, it can be seen that the transformer (SA+GA) model paid strong attention to knowledge entities that appeared repeatedly in knowledge facts in particular, it can be seen that the transformer (SA+GA) model paid attention to Q3476753, Q290666, and "Ireland" with attention scores of 0.237, 0.221, and 0.202.

Meanwhile, in FIG. 10, the hypergraph transformer paid attention to correct knowledge hyperedges and inferred correct answers by taking into consideration multi-hop facts about "the places of birth" of people shown in the given image in contrast, the transformer (SA+GA) paid strong attention to the knowledge entity of the person (Q2439789) shown in the image with an undesired attention score of 0.788. The second and third focused-on knowledge entities were another person (Q7141361) and "Iran." The transformer (SA+GA) failed to focus on multi-hop facts required to answer a given question, and ultimately predicted an answer with a wrong number.

The term "unit" used in the above-described embodiments means software or a hardware component such as a field-programmable gate array (FPGA) or application-specific integrated circuit (ASIC) and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

The reasoning method based on a structural attention mechanism for knowledge-based question answering according to the embodiment described with reference to FIG. 3 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the reasoning method based on a structural attention mechanism for knowledge-based question answering according to the embodiment described with reference to FIG. 3 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the reasoning method based on a structural attention mechanism for knowledge-based question answering according to the embodiment described with reference to FIG. 3 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described solutions, there may be proposed the reasoning method based on a structural attention mechanism for knowledge-based question answering that encodes multi-hop associations by using hypergraph structures and learns how to pay attention to important knowledge evidence for a question by using the transformer-based attention mechanism, thereby being able to obtain a correct answer by performing reasoning when a question requiring knowledge for given content is given, and there may also be proposed the computing apparatus for performing the reasoning method.

Furthermore, there may be proposed the reasoning method based on a structural attention mechanism for knowledge-based question answering that updates node representations through the hyperedge matching of hypergraphs instead of a message passing method, so that an update process can effectively learn high-order semantics unique to each of the respective hypergraphs and high-order associations between the two hypergraphs, and there may also be proposed the computing apparatus for performing the reasoning method.

Furthermore, there may be proposed the reasoning method based on a structural attention mechanism for knowledge-based question answering that, in knowledge-based question answering, assumes a situation in which supervision for a reasoning process is not given and then models the reasoning process by itself, and there may also be proposed the computing apparatus for performing the reasoning method.

Furthermore, there may be proposed the reasoning method based on a structural attention mechanism for knowledge-based question answering that can learn a reasoning process itself even without the supervision of the reasoning process by a human in a knowledge-based question answering problem, so that the cost and time inefficiency of collecting data on the supervision of the reasoning process by a human can be eliminated, and there may also be proposed the computing apparatus for performing the reasoning method.

Furthermore, there may be proposed the reasoning method based on a structural attention mechanism for knowledge-based question answering in which there no restriction on input content and there is no restriction on the types and number of given knowledge graphs, and there may also be proposed the computing apparatus for performing the reasoning method.

Moreover, there may be proposed the reasoning method based on a structural attention mechanism for knowledge-based question answering that allows the knowledge information and reasoning process used for reasoning to be checked as intermediate products, so that interpretability is relatively improved compared to other deep learning-based methodologies.

The effects that can be obtained by the embodiments disclosed herein are not limited to the effects described above, and other effects not described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A reasoning method based on a structural attention mechanism for knowledge-based question answering, the reasoning method being performed by a computing apparatus, by at least one processor executing instructions stored in a memory of the computing apparatus, the reasoning method comprising:

recognizing one or more entities in a query, the query including content and a question, and linking recognized entities to a knowledge base;

constructing a question hypergraph and a query-aware knowledge hypergraph by performing a multi-hop graph walk on a question graph and the knowledge base, the multi-hop graph walk being started from a node to which one of the recognized entities in the query is linked and then traversing other nodes linked on a per-triplet basis; and inferring a correct answer to the question by applying an attention mechanism to a query hyperedge and a knowledge hyperedge included in the question hypergraph and the query-aware knowledge hypergraph, respectively, wherein constructing the question hypergraph and the query-aware knowledge hypergraph comprises:

constructing the question hypergraph by setting a node sequence, recognized as a phrase, as a question hyperedge in a question graph structured by defining each word included in the question as a node and linking adjacent nodes by edges; and constructing the query-aware knowledge hypergraph by, in the knowledge base to which the recognized entities are linked, performing the multi-hop graph walk from a knowledge node, to which each of the recognized entities is linked, to a tail node and then setting all nodes, traversed by the multi-hop graph walk, as one hyperedge, and wherein inferring the correct answer comprises:

converting the question hyperedge into a dense representation of the question hyperedge by embedding the question hyperedge and applying a linear projection function using a projection matrix, and converting the knowledge hyperedge into a dense representation of the knowledge hyperedge by embedding the knowledge hyperedge and applying a linear projection function using a projection matrix;

obtaining single vector representations respectively corresponding to the knowledge hyperedge and the question hyperedge by passing the dense representations of the knowledge hyperedge and the question hyperedge through the attention mechanism, the attention mechanism sequentially comprising guided-attention blocks and self-attention blocks; and predicting the correct answer to the question by using the single vector representations obtained from the self-attention blocks, wherein each guided-attention block updates the dense representation corresponding to either the question hyperedge or the knowledge hyperedge based on an output of a guided-attention function that takes a query vector, a key vector, and a value vector as inputs, wherein the key vector and the value vector form a key-value pair, and the query vector inputted to the guided-attention function is a linear projection of one of the dense representations, and the key vector and value vector inputted to the guided-attention function are each linear projections of the other dense representation; and wherein each self-attention block further updates a dense representation obtained from a guided-attention block based on an output of a self-attention function that takes a query vector, a key vector, and a value vector as inputs, and the query vector, key vector, and value vector inputted to the self-attention function are each linear projections of the same dense representation.

2. The reasoning method of claim 1, wherein the linking the recognized entities to the knowledge base comprises:

recognizing one or more entities in the content;

searching for knowledge nodes corresponding to the recognized entities in the knowledge base; and linking the recognized entities to found knowledge nodes as new nodes.

3. The reasoning method of claim 1, wherein predicting the correct answer comprises predicting a correct answer to the question by using one of a similarity-based answer predictor and a multi-layer perceptron-based answer predictor.

4. A non-transitory computer-readable storage medium having stored thereon a program that, when executed by a processor, causes the processor to execute the reasoning method set forth in claim 1.

5. A computer program that is executed by a computing apparatus and stored in a non-transitory computer-readable storage medium in order to perform the reasoning method set forth in claim 1.

6. A computing apparatus for implementing a hypergraph transformer model and performing reasoning based on a structural attention mechanism for knowledge-based question answering, the computing apparatus comprising:

a memory storing instructions for performing reasoning based on the structural attention mechanism for knowledge-based question answering and a program for implementing the hypergraph transformer model; and at least one processor configured to execute the instructions stored in the memory to perform the reasoning based on the structural attention mechanism for knowledge-based question answering and to execute the program for implementing the hypergraph transformer model, wherein the hypergraph transformer model comprises:

an entity linker configured to recognize one or more entities in a query and link recognized entities to knowledge nodes of a knowledge base;

a hypergraph constructor configured to construct a question hypergraph based on a question and also construct a query-aware knowledge hypergraph based on the knowledge base to which the recognized entities are linked; and a transformer model configured to apply an attention mechanism to a query hyperedge and a knowledge hyperedge included in the question hypergraph and the query-aware knowledge hypergraph, respectively, wherein the hypergraph constructor constructs the question hypergraph by setting a node sequence, recognized as a phrase, as a question hyperedge in a question graph structured by defining each word included in the question as a node and linking adjacent nodes by edges; and the hypergraph constructor constructs the query-aware knowledge hypergraph by, in the knowledge base to which the recognized entities are linked, performing a multi-hop graph walk from a knowledge node, to which each of the recognized entities is linked, to a tail node and then setting all nodes, traversed by the multi-hop graph walk, as one hyperedge, and wherein the transformer model converts the question hyperedge into a dense representation of the question hyperedge by embedding the question hyperedge and applying a linear projection function using a projection matrix, and converts the knowledge hyperedge into a dense representation of the knowledge hyperedge by embedding the knowledge hyperedge and applying a linear projection function using a projection matrix, and wherein the attention mechanism of the transformer model sequentially comprises guided-attention blocks and self-attention blocks, and is configured to obtain single vector representations respectively corresponding to the knowledge hyperedge and the question hyperedge by passing the dense representations of the knowledge hyperedge and the question hyperedge through the guided-attention blocks and the self-attention blocks, and a correct answer predictor configured to predict a correct answer to the question by concatenating single vector representations obtained from the self-attention blocks, wherein each guided-attention block updates the dense representation corresponding to either the question hyperedge or the knowledge hyperedge based on an output of a guided-attention function that takes a query vector, a key vector, and a value vector as inputs, wherein the key vector and the value vector form a key-value pair, and the query vector inputted to the guided-attention function is a linear projection of one of the dense representations, and the key vector and value vector inputted to the guided-attention function are each linear projections of the other dense representation; and wherein each self-attention block updates a dense representation obtained from a guided-attention block based on an output of a self-attention function that takes a query vector, a key vector, and a value vector as inputs, and the query vector, key vector, and value vector inputted to the self-attention function are each linear projections of the same dense representation.

* * * * *